United States Patent
Wang et al.

(10) Patent No.: US 11,417,028 B2
(45) Date of Patent: Aug. 16, 2022

(54) IMAGE PROCESSING METHOD AND APPARATUS, AND STORAGE MEDIUM

(71) Applicant: BEIJING XIAOMI MOBILE SOFTWARE CO., LTD., Beijing (CN)

(72) Inventors: Qian Wang, Beijing (CN); Yu Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/930,256

(22) Filed: May 12, 2020

(65) Prior Publication Data
US 2021/0174553 A1    Jun. 10, 2021

(30) Foreign Application Priority Data
Dec. 10, 2019    (CN) .......................... 201911260802.5

(51) Int. Cl.
*G06T 9/20* (2006.01)
*G06T 7/12* (2017.01)
(Continued)

(52) U.S. Cl.
CPC ................. *G06T 9/20* (2013.01); *G06T 5/003* (2013.01); *G06T 5/50* (2013.01); *G06T 7/12* (2017.01); *G06T 2207/20192* (2013.01)

(58) Field of Classification Search
CPC ......... G06T 7/0081; G06T 2207/20144; G06T 7/0083; G06T 2207/10016; G06T 7/11; G06T 2207/20036; G06T 11/60; G06T 9/20; G06T 7/12; G06T 2207/20192; G06T 2207/20092; G06T 5/003; G06T 5/50;
(Continued)

(56) References Cited

U.S. PATENT DOCUMENTS 6,587,599 B1 * 7/2003 Huang .................... G06T 11/60
                                                            345/629
2012/0087551 A1    4/2012 Bhagwan et al.
(Continued)

FOREIGN PATENT DOCUMENTS

CN    104484867 A    4/2015
CN    107948460 A    4/2018
(Continued)

OTHER PUBLICATIONS

Extended European Search Report in the European Application No. 20177460.1, dated Nov. 24, 2020, (8p).
(Continued)

*Primary Examiner* — Duy M Dang
(74) *Attorney, Agent, or Firm* — Arch & Lake LLP

(57) ABSTRACT

Provided are an image processing method, apparatus and a storage medium. The method includes: collecting at least one image within a field of view of an image collection device in real time through the image collection device of a terminal device; determining whether a first image includes at least one character based on the collected first image; under a situation that the collected first image includes the character, outputting prompt information to a user; receiving a setting instruction input by the user; and improving sharpness of the character according to the setting instruction to obtain a second image, and compressing and storing the second image.

17 Claims, 6 Drawing Sheets

(51) Int. Cl.
*G06T 5/00* (2006.01)
*G06T 5/50* (2006.01)

(58) Field of Classification Search
CPC .. G06K 9/38; G06K 9/00456; G06K 9/00463; G06K 9/66; G06K 9/00442; G06K 9/2054; G06K 2209/01; G06K 9/34; G06K 9/344; G06K 9/342; G06K 9/348; G06K 9/346; G06K 9/03; G06K 9/6262; G06K 9/036; G06K 9/36
See application file for complete search history.

(56) References Cited

U.S. PATENT DOCUMENTS

| | | |
|---|---|---|
| 2014/0032406 A1 | 1/2014 | Roach et al. |
| 2014/0226878 A1 | 8/2014 | Bhagwan et al. |
| 2014/0270528 A1 | 9/2014 | Ramos et al. |
| 2014/0333971 A1 | 11/2014 | Macciola et al. |
| 2015/0178895 A1 | 6/2015 | Owaki et al. |
| 2017/0024594 A1 | 1/2017 | Bhagwan et al. |
| 2017/0270508 A1 | 9/2017 | Roach et al. |
| 2019/0042817 A1 | 2/2019 | Bhagwan et al. |
| 2020/0210739 A1 | 7/2020 | Miginnis et al. |

FOREIGN PATENT DOCUMENTS

| | | |
|---|---|---|
| CN | 108764261 A | 11/2018 |
| CN | 106296665 B | 5/2019 |
| WO | 2019022725 A1 | 1/2019 |

OTHER PUBLICATIONS

First Office Action of the Chinese Application No. 201911260802.5, dated Nov. 19, 2021, (15p).

\* cited by examiner

IMAGE PROCESSING METHOD AND APPARATUS, AND STORAGE MEDIUM

CROSS-REFERENCE TO RELATED APPLICATION

This application is based upon and claims priority to Chinese patent application No. 201911260802.5 filed on Dec. 10, 2019, the entire contents of which are incorporated herein by reference.

TECHNICAL FIELD

The present disclosure generally relates to a computer technology, and more particularly, to an image processing method and apparatus as well as a storage medium.

BACKGROUND

Mobile terminals have become an indispensable part of people's lives, work and study. More and more users select cameras of mobile terminals for image collection and store collected image information into the mobile terminals.

However, a memory of a mobile terminal is limited. Therefore, how to store as much image information as possible using a limited memory resource without impacting reading of the image information by a user becomes a problem urgent to be solved.

SUMMARY

The present disclosure provides an image processing method and apparatus as well as a storage medium.

According to a first aspect of the present disclosure, an image processing method may include that: an image within a field of view of an image collection device is collected in real time through the image collection device of a terminal device, the at least one image comprises a first image; whether the first image includes at least one character is determined based on the collected first image; in response to determining that the collected first image includes the at least one character, prompt information is output to a user; a setting instruction input by the user is received; and sharpness of the at least one character is improved according to the setting instruction to obtain a second image, and the second image is compressed and stored.

According to a second aspect of the present disclosure, an image processing apparatus may include: a processor; and a memory configured to store instructions executable by the processor. The processor may be configured to: collect at least one image within a field of view of an image collection device in real time through the image collection device of a terminal device, the at least one image including a first image; determine whether the first image includes at least one character, in response to determining that the first image includes the at least one character, output prompt information to a user; receive a setting instruction input by the user; and improve sharpness of the at least one character according to the setting instruction to obtain a second image and compress and store the second image.

According to a third aspect of the present disclosure, a non-transitory computer-readable storage medium is provided, which has instructions stored thereon that, when executed by a processor of an image processing apparatus, enable the apparatus to implement the image processing method in the first aspect.

The technical solutions provided by embodiments of the present disclosure may have beneficial effects.

In the embodiments of the present disclosure, a terminal device, when collecting images in real time and after determining based on a collected first image that the first image includes a character, may output prompt information, improve the sharpness of the character according to a setting instruction and compress and store the processed image, so that the image processing apparatus may alleviate the impact on reading of a user due to the image quality damage caused by image compression or impact on reading of the user because of low quality of the collected first image. According to the present disclosure, the sharpness of a character may be improved to mitigate the impact on reading of a user and improve a user experience while reducing memory occupied by the image.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terminologies used in the disclosure are for the purpose of describing the specific embodiments only and are not intended to limit the disclosure. The singular forms "one", "the" and "this" used in the disclosure and the appended claims are intended to include the plural forms, unless the context clearly indicates other meanings. It should also be understood that the term "and/or" as used herein refers to and includes any or all possible combinations of one or more associated listed items.

It should be understood that, although the terminologies "first", "second", "third" and so on may be used in the disclosure to describe various information, such information shall not be limited to these terms. These terms are used only to distinguish information of the same type from each other. For example, without departing from the scope of the disclosure, first information may also be referred to as second information. Similarly, second information may also be referred to as first information. Depending on the context, the word "if" as used herein may be explained as "when . . . ", "while" or "in response to determining."

Figure 1:
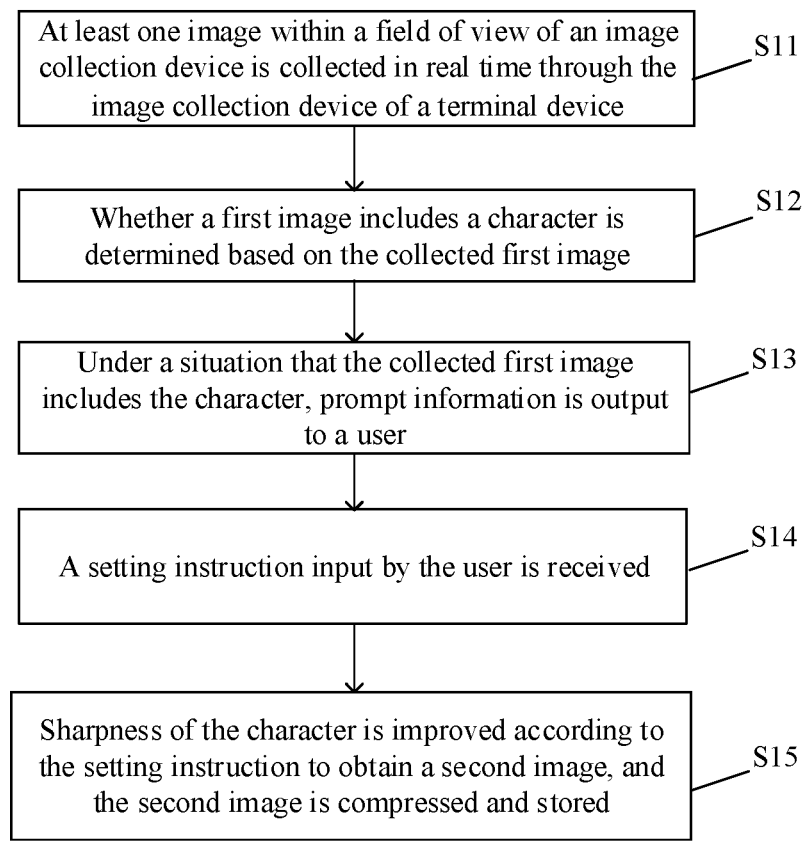
FIG. 1 is a flowchart showing an image processing method according to embodiments of the present disclosure.

The embodiments of the present disclosure provide an image processing method, which is applied to an image processing apparatus. FIG. 1 is a flowchart showing an image processing method according to embodiments of the present disclosure. The method is applied to a terminal device. As shown in FIG. 1, the method may mainly include the following operations.

In S11, at least one image within a field of view of an image collection device is collected in real time through the image collection device of the terminal device.

In S12, whether a first image includes a character is determined based on the collected first image.

In S13, under a situation that the collected first image includes the character, prompt information is output to a user.

In S14, a setting instruction input by the user is received.

In S15, sharpness of the character is improved according to the setting instruction to obtain a second image, and the second image is compressed and stored.

In the embodiments of the present disclosure, the terminal device may be a mobile device or fixed device with a storage function, such as a mobile phone, a tablet computer, a Personal Computer (PC) and the like.

The terminal device may include the image collection device, which may collect images in real time. For example, the image collection device is a camera.

In S11, the image collection device of the terminal device may collect the images within the field of view in real time. The field of view may be a spatial range that may be collected in a present orientation and in a collection time range of the image collection device.

In S12, the terminal device may determine whether the first image includes the character based on the first image collected in real time. The character may be graphics formed by character collection.

In S13, the terminal device, after determining that the obtained first image includes the character, may output the prompt information to a user. For example, the terminal device may display the prompt information on a display screen, or the terminal device may output the prompt information in a voice broadcast manner.

In S14 and S15, the terminal device may receive the setting instruction input by the user, then improve the sharpness of the character according to the setting instruction and compress and store the second image, so that the image processing apparatus may improve a reading experience of the user while saving a storage space.

It is to be noted that the operation that the terminal device receives the setting instruction input by the user may include that: the terminal device receives a voice instruction or a click instruction input by the user. Moreover, a time length of receiving the setting instruction may also be set in the terminal device. For example, if the setting instruction is received within a predetermined time length (for example, 3 s), the sharpness of the character may be improved for compression and storage.

Figure 2:
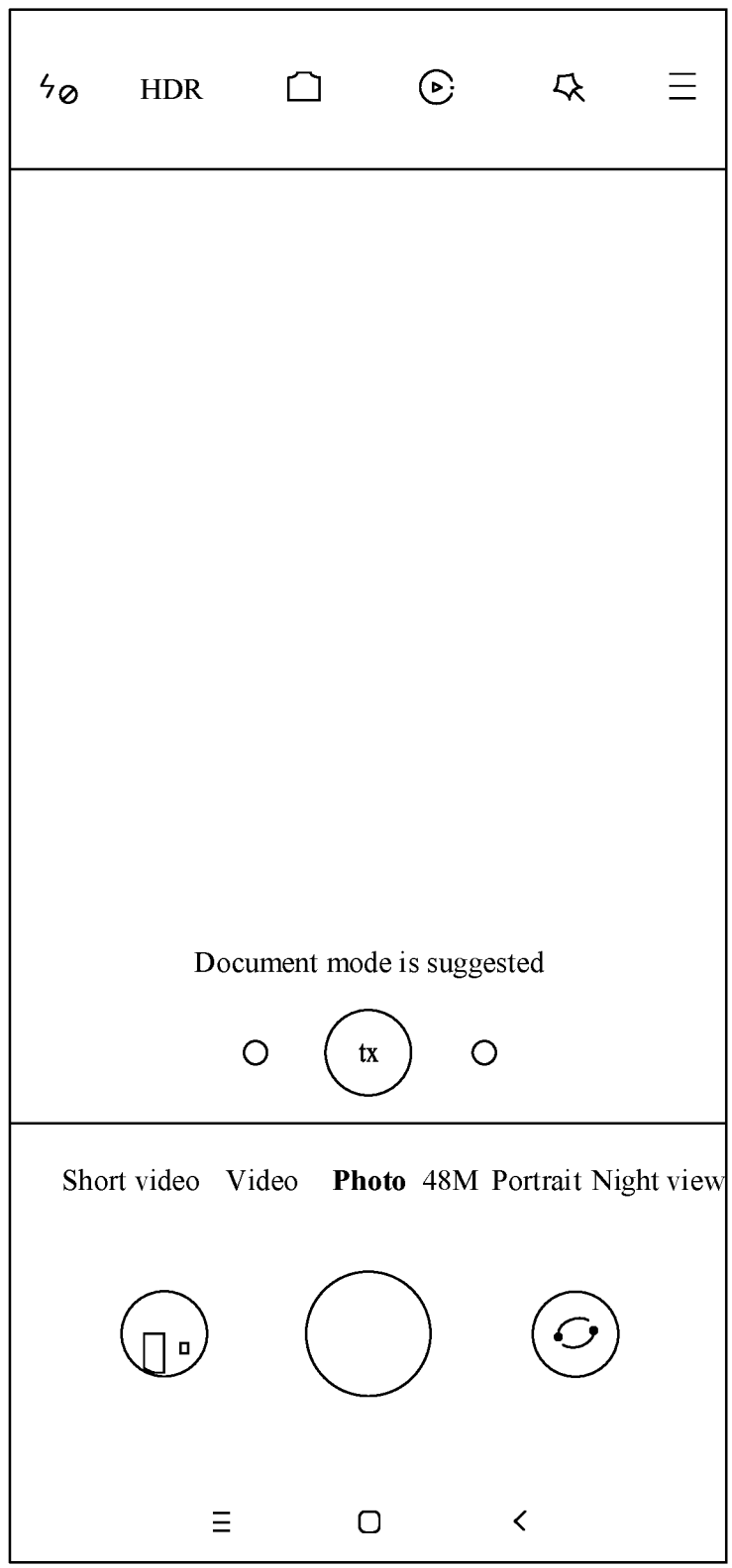
FIG. 2 is a schematic diagram illustrating an image acquisition interface in a mobile phone according to embodiments of the present disclosure.

For example, the terminal device is a mobile phone. FIG. 2 is a schematic diagram illustrating an image acquisition interface in a mobile phone according to embodiments of the present disclosure. As shown in FIG. 2, when the mobile phone shoots images in real time, after it is determined that the collected first image includes a character, the prompt information "document mode is suggested" may be output on the interface. After the user inputs the setting instruction "use the document mode" based on the prompt information, the mobile phone may improve the sharpness of the character according to the setting instruction to obtain the second image and then compress and store the second image.

In an embodiment, the image processing method may further include that:

the first image is segmented to acquire the character and a peripheral image region of the character in the first image;

the operation that whether the first image includes the character is determined based on the collected first image may include that:

whether the first image includes the character which has a region larger than a preset area threshold is determined; and the operation that the sharpness of the character is improved may include that:

an edge of the character is sharpened, and a contrast between the character and the peripheral image region of the character is increased.

In the embodiments, the terminal device, after determining that the first image includes a character, may determine the character region or the non-character peripheral image region based on an image segmentation algorithm. The image segmentation algorithm may be a watershed algorithm, an edge segmentation algorithm or a threshold segmentation algorithm, and so on. The detailed introductions are omitted in the embodiments of the present disclosure.

In a case that the character and a peripheral image region of the character in the first image are acquired by the image segmentation algorithm, segmentation may be performed based on constraints including a stroke characteristic, a length-width ratio structural characteristic and the like of the character to determine the character region and the peripheral image region of the character in a process of adopting the image segmentation algorithm. The stroke characteristic may refer to a basic stroke of Chinese characters, including basic strokes such as "a dot stroke ( ` ), a horizontal stroke (⼀), a vertical stroke (丨), a left-falling stroke (丿), a right-falling stroke (丶) a rising stroke (⼂), a turning stroke (丨) and a hook stroke (亅)". The length-width ratio structural characteristic may include that a length-width ratio of a Chinese character is usually between 1.0 and 1.4.

Under a normal condition, an image requiring improved sharpness of a character and then being subjected to compression and storage is mainly a character-based image, for example, a document image. The first image collected by the terminal device in real time may not be a document image with many characters. For example, the first image may be a billboard image that is mainly based on a picture but also includes a few slogans. However, the billboard image is not a document image. Therefore, for highlighting the necessity of the sharpness of characters, the terminal device may determine whether the first image includes a character of which the character region is larger than the preset area threshold in the embodiments of the present disclosure.

For example, in a case that the character region is larger than the preset area threshold, it is determined that the first image includes the character, otherwise, in a case that the character region is smaller than or equal to the preset area threshold, it is determined that the first image does not include the character.

After determining that the first image includes the character, the terminal device may output the prompt information and, after the user determines that the first image is an important document image, may improve the sharpness of the character based on the setting instruction of the user and compresses and stores the processed image. When the sharpness of the character is improved, an image enhancement algorithm may be adopted. For example, the edge of the character may be sharpened through an image sharpening algorithm to highlight the edge of the character more obviously. For another example, the contrast between the character and the peripheral image region of the character may be increased through a contrast stretching algorithm to highlight the character based on the increased contrast.

Furthermore, in the embodiments of the present disclosure, noises of the character and the peripheral image region of the character may further be reduced through an image denoising algorithm to make the whole first image clearer, thereby improving a reading experience of the user.

In an embodiment, the operation that the first image is segmented to acquire the character and a peripheral image region of the character in the first image may include that:
the first image is segmented to acquire different image regions; and
optical character recognition is performed on sub images within the different image regions to acquire the region of the character and the peripheral image region of the character in the first image.

In the embodiments of the present disclosure, not only may the region of the character and the peripheral image region of the character in the first image be acquired based on the image segmentation algorithm, but also the region of the character and the peripheral image region of the character may be acquired by combining the image segmentation algorithm and an optical character recognition method.

For example, when the first image is segmented, the different image regions may be acquired by a threshold segmentation method, and optical character recognition may be sequentially performed on the sub images within the different image regions obtained by segmentation to distinguish the region of the character from the peripheral image region of the character.

In addition, in the embodiments of the present disclosure, the terminal device may also determine whether the first image includes the character based on a neural network. For example, the terminal device may determine whether the first image includes the character by use of an image classification model which is pre-trained by a neural network algorithm. The image classification model may be trained by the terminal device or may be obtained from another device through the terminal device. There are no limits made in the embodiment of the present disclosure.

For example, the image classification model may be trained based on a large amount of non-character image data and image data including characters. The non-character image data may include a face image, an animal image, a fruit image and the like, and images including characters may include a WORD document image, a press/book page image, a presentation file image and the like.

In an embodiment, the operation that optical character recognition is performed on the sub images within the different image regions to acquire the region of the character and the peripheral image region of the character in the first image may include that:

the sub images within the different image regions are recognized based on optical character recognition to obtain character recognition results of the sub images within the different image regions and confidences of the character recognition results; and in a case that a confidence of a sub image within an image region is higher than a first threshold, it is determined that the image region is the region including the character in the first image, otherwise, in a case that the confidence of the sub image of the image region is lower than or equal to the first threshold, it is determined that the image region is the peripheral image region of the character.

Under a normal condition, in a case that an image is recognized based on the optical character recognition method, if the image includes no character, a character recognition result may be null, or, the character recognition result may be not null but a confidence of the character recognition result may be low; and if the image includes a character, the character recognition result may be not null and the confidence may be high. Determining whether the character is included in combination with the confidence may improve accuracy of determining whether the image includes the character.

Therefore, in the embodiments, the sub images within the different image regions in the first image may be recognized based on an optical character recognition algorithm and whether each image region is the region including the character may be determined according to the confidence of the character recognition result.

For example, if the first threshold is 0.5, in a case that the confidence of the character recognition result of the sub image of the image region is greater than 0.5, it may be determined that the image region is the region including the character, otherwise, in a case that the confidence of the character recognition result of the sub image of the image region is lower than or equal to 0.5, it may be determined that the image region is the peripheral image region of the character.

In a case that the image is recognized by the optical character recognition method, the confidence of the recognition result usually also may reflect sharpness of the image. Under a normal condition, when the character is sharp, the character recognition result can be relatively accurate and the confidence of the character recognition result can be relatively high. In a case that the character is not sharp enough, the character recognition result may not be so accurate and the confidence of the character recognition result may be relatively low. Under a situation that the character is not sharp enough, the character that is not sharp enough still includes a character characteristic, which includes the stroke characteristic and a structural characteristic such as the length-width ratio or other characteristics, therefore, compared with a non-character image including no character characteristic, the confidence of the recognition result thereof may be higher than a confidence of a recognition result of the non-character image.

In an embodiment, the method may further include that:
the first image is compressed in a case that the confidence of the sub image of the image region including the character is higher than a second threshold, the second threshold being greater than the first threshold.

In the embodiment, the second threshold may be a numerical value greater than the first threshold. For example, the second threshold is 0.9. In a case that the confidence of the character recognition result of the sub image of the image region including a character in the first image is higher than the second threshold, it may be indicated that the character in the image region is sharp, so that the first image may be directly compressed without improving the sharpness of the character in the first image.

According to the method, memory increase caused by improvement of the sharpness of a character in the first image may be reduced, and in addition, directly compressing the first image may also not bring any impact to the reading experience of a user.

In an embodiment, the operation that the sharpness of the character is improved to obtain the second image may include that:
- in a case that the confidence is lower than or equal to the second threshold, the sharpness of the character is improved to obtain the second image.

In the embodiment, in a case that the character recognition result of the first image is lower than or equal to the second threshold, it may be indicated that a character in the first image is not sharp enough, so that the sharpness of the character is required to be improved.

In the embodiment, in an optical character recognition manner, not only may whether the first image includes a character be determined based on the confidence of the character recognition result, but also whether the sharpness of the character in the first image is required to be improved may be determined based on the confidence, so that intelligence of the image processing apparatus is improved.

In an embodiment, the image processing method may further include that:
- whether an image compression function is enabled is determined according to image compression information in the setting instruction.

S15 may include that:
- in a case that the image compression function is enabled and the first image includes the character, the sharpness of the character is improved to obtain the second image, and the second image is compressed and stored.

In the embodiments, the setting instruction received by the terminal device may contain the image compression information, and the compression information may be used to indicate whether the image compression function is enabled. The terminal device, when determining according to the received image compression information that the image compression function is enabled, under a situation that the first image includes the character, may improve the sharpness of the character to obtain the second image and compress and store the second image. Enabling or disabling of the image compression function may be set based on a requirement of a user. Compared with enhancing the character of the first image for compression in a unified manner no matter whether the function is enabled, this manner has the advantage that unnecessary processing for sharpness enhancement of the character may be reduced.

Figure 3:
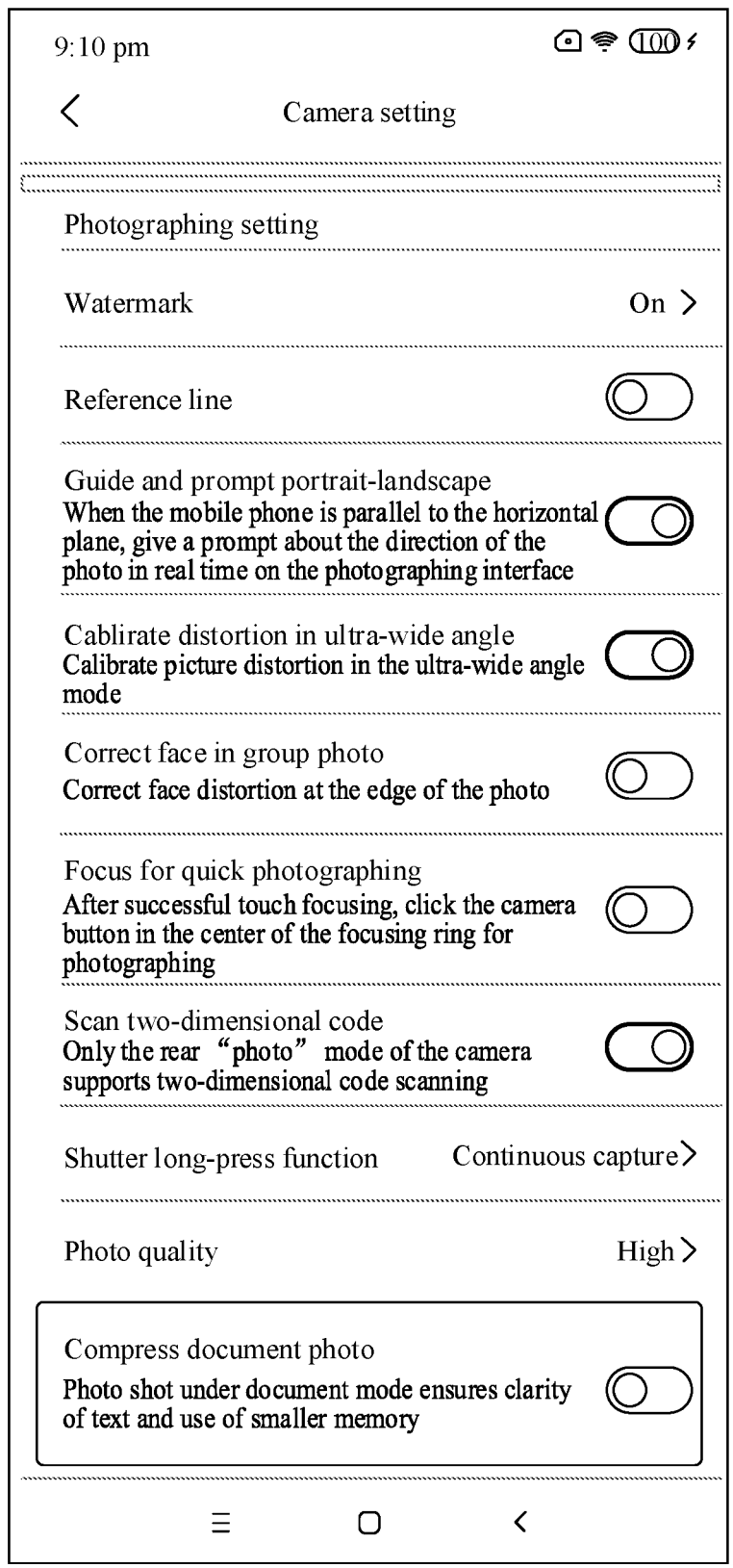
FIG. 3 is a schematic diagram illustrating an interface for setting an image compression function in a mobile phone according to embodiments of the present disclosure.

FIG. 3 is a schematic diagram illustrating an interface for setting an image compression function in a mobile phone according to embodiments of the present disclosure. As shown in FIG. 3, a "compress document photo" function may be set in a camera setting column. The "compress document photo" function may be the image compression function, and a user may set whether to enable the "compress document photo" function. In a case that the "compress document photo" function is enabled, character sharpness improvement and compression may be performed on a photo shot in a document mode to reduce occupied memory and simultaneously ensure the sharpness. In a case that the "compress document photo" function is disabled, character sharpness improvement may be performed on the photo shot in the document mode, but no compression is executed.

In an application scenario, when a large number of character-based documents such as book pages, journals and data are required to be shot, a user may set the "compress document photo" function to be enabled to avoid occupation of large memory when the large number of documents are stored after character sharpness improvement. In a case that documents required to be shot include many characters in complex layouts and have relatively small font sizes, but the number of the shot documents is small and a shooting purpose is sharing and sending to others or for consultation in the future, the "compress document photo" function may be set to be disabled to improve sharpness of the characters for convenient reading of the user under a situation that the small number of shot documents may not occupy large memory.

It can be understood that, in the embodiments, the image compression function may be set to improve the sharpness of the character to obtain the second image and simultaneously make it convenient for the user to determine whether to further compress the second image according to different usage scenarios, so that the user experience is improved.

In an embodiment, the operation that the second image is compressed and stored may include at least one of the following operations:
- the colored second image is converted into a black-and-white image for storage; and
- the colored second image is converted into a gray image for storage.

When the image is compressed, an image with a lower resolution may be acquired in a clipping compression manner. For example, an image is down-sampled to obtain an image with a lower resolution, or an image is clipped to obtain an image with a smaller size. However, adopting the two manners in scenarios that a character is small, a page background is complex and a shooting distance is long may make a user difficult to recognize the content of the character in the image.

In the embodiments of the present disclosure, for the first image including a character, a user may pay more attention to the content of the character rather than richness of displayed colors. When the second image is displayed through a black-and-white image, the character may further be highlighted. Therefore, in the present disclosure, after the sharpness of the character in the first image is improved to obtain the second image, the colored second image may be converted into the black-and-white image or the gray image to reduce the occupied memory. The second image converted into the black-and-white image or the gray image may further be clipped.

Figure 4:
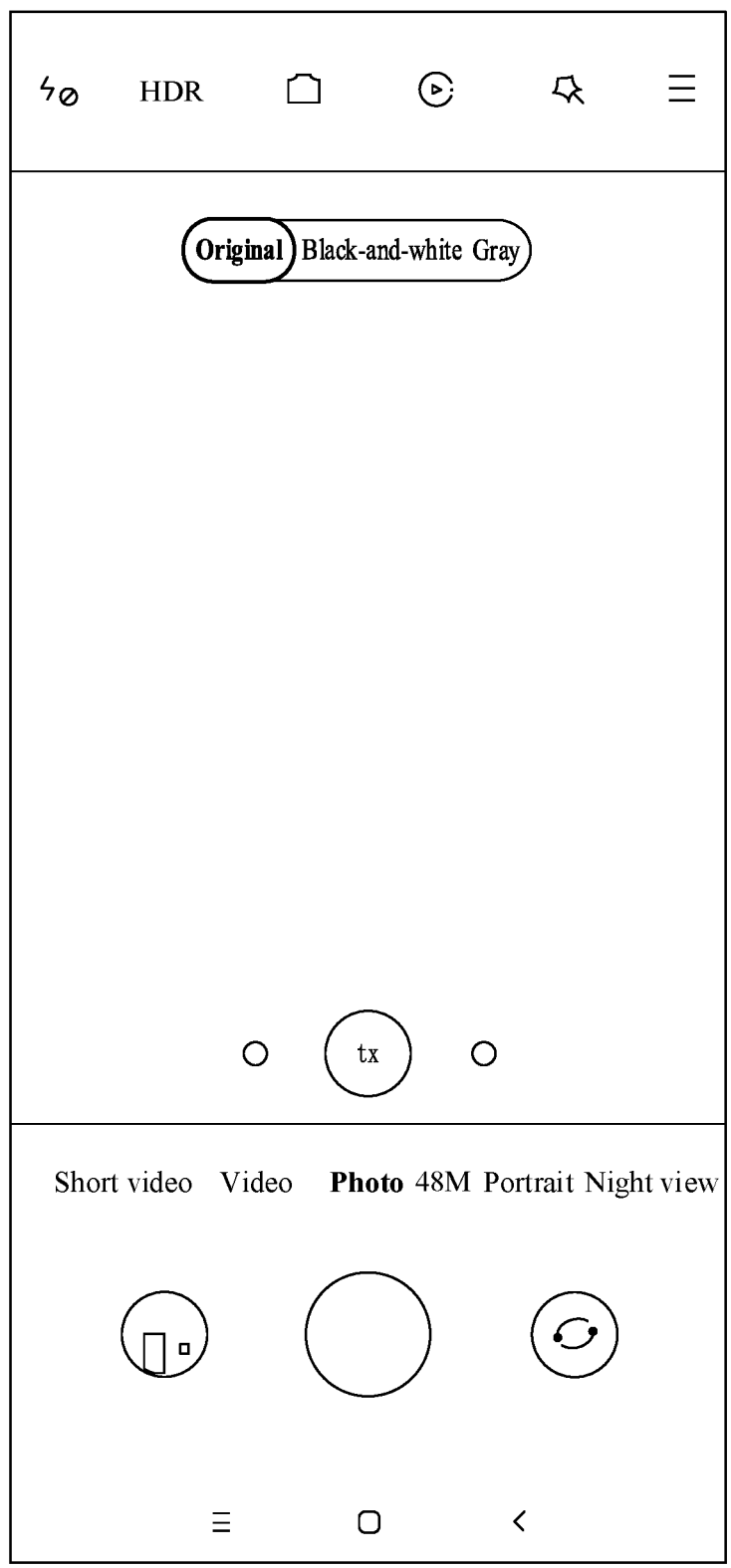
FIG. 4 is a schematic diagram illustrating a shooting interface in a mobile phone according to embodiments of the present disclosure.

A manner for compressing the second image may also be set by a user. FIG. 4 is a schematic diagram illustrating a shooting interface in a mobile phone according to embodiments of the present disclosure. As shown in FIG. 4, a user may set different compression manners such as "original", "black-and-white", "gray" or the like to be selected to compress the second image. In a case that the user sets the "original" manner, the compressed second image may be a clipped colored image. In a case that the user sets the "black-and-white" manner, the compressed second image may be a clipped or unclipped black-and-white image. In a case that the user sets the "gray" manner, the compressed second image may be a clipped or unclipped gray image.

In the embodiments, the image processing apparatus may, after determining that the first image includes a character, improve the sharpness of the character and compress and store the processed image, so that the memory occupied by the image can be reduced, and meanwhile, impact on reading of a user is reduced. Furthermore, during compression, the colored second image may be further converted into a black-and-white image or gray image occupying a smaller amount of data and store the converted image, and a display effect of the character may further be highlighted in case of being displayed with the black-and-white image, so that the user experience may be improved.

Figure 5:
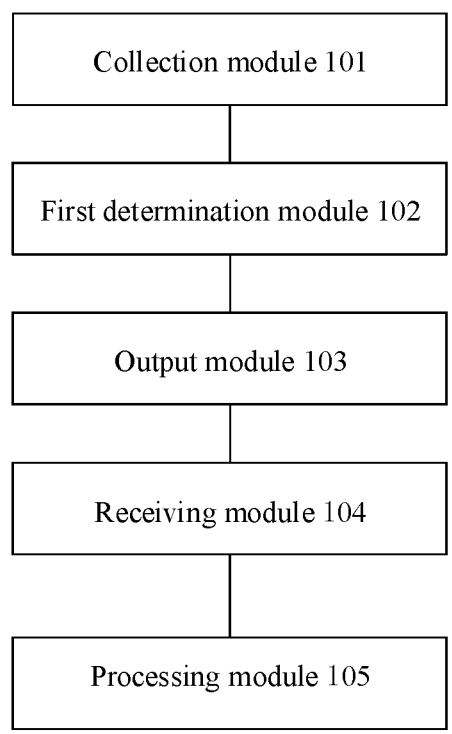
FIG. 5 is a block diagram of an image processing apparatus according to some embodiments.

FIG. 5 is a block diagram of an image processing apparatus according to some embodiments. The image processing apparatus 800 is applied to a terminal device, and as shown in FIG. 5, mainly includes:

a collection module 101, configured to collect at least one image within a field of view of an image collection device in real time through the image collection device of a terminal device;

a first determination module 102, configured to determine whether a first image includes a character based on the collected first image;

an output module 103, configured to, under a situation that the collected first image includes the character, output prompt information to a user;

a receiving module 104, configured to receive a setting instruction input by the user; and a processing module 105, configured to improve sharpness of the character according to the setting instruction to obtain a second image and compress and store the second image.

In one embodiment, the apparatus may further include:
an acquisition module 106, configured to segment the first image to acquire the character and a peripheral image region of the character in the first image;

the first determination module 102 is specifically configured to determine whether the first image includes the character which has a region larger than a preset area threshold; and the processing module 105 is specifically configured to sharpen an edge of the character and/or increase a contrast between the character and the peripheral image region of the character.

In one embodiment, the acquisition module 106 may be specifically configured to segment the first image to acquire different image regions and perform optical character recognition on sub images within the different image regions to acquire the region of the character and the peripheral image region of the character in the first image.

In one embodiment, the acquisition module 106 may be specifically configured to recognize the sub images within the different image regions based on optical character recognition to obtain character recognition results of the sub images within the different image regions and confidences of the character recognition results; in a case that a confidence of a sub image within an image region is higher than a first threshold, determine that the image region is the region including the character in the first image, otherwise, in a case that the confidence of the sub image of the image region is lower than or equal to the first threshold, determine that the image region is the peripheral image region of the character.

In one embodiment, the apparatus may further include:
a compression module 107, configured to compress the first image in a case that the confidence of the sub image of the image region including the character is higher than a second threshold, the second threshold being greater than the first threshold.

In one embodiment, the processing module 105 may be specifically configured to, in a case that the confidence is lower than or equal to the second threshold, improve the sharpness of the character to obtain the second image.

In one embodiment, the apparatus may further include:
a second determination module 108, configured to determine whether an image compression function is enabled according to image compression information in the setting instruction; and the processing module 105 is specifically configured to, in a case that the image compression function is enabled and the first image includes the character, improve the sharpness of the character to obtain the second image and compress and store the second image.

In one embodiment, the processing module 105 may be specifically configured to convert the colored second image into a black-and-white image for storage and/or convert the colored second image into a gray image for storage.

With respect to the apparatus in the above embodiments, the specific manners for performing operations for individual modules therein have been described in detail in the embodiment regarding the method, which will not be elaborated herein.

Correspondingly, the present disclosure also provides an image processing apparatus, which includes: a processor; and a memory configured to store instructions executable by the processor, wherein the processor is configured to execute the operations in any image processing method in the abovementioned embodiments.

Figure 6:
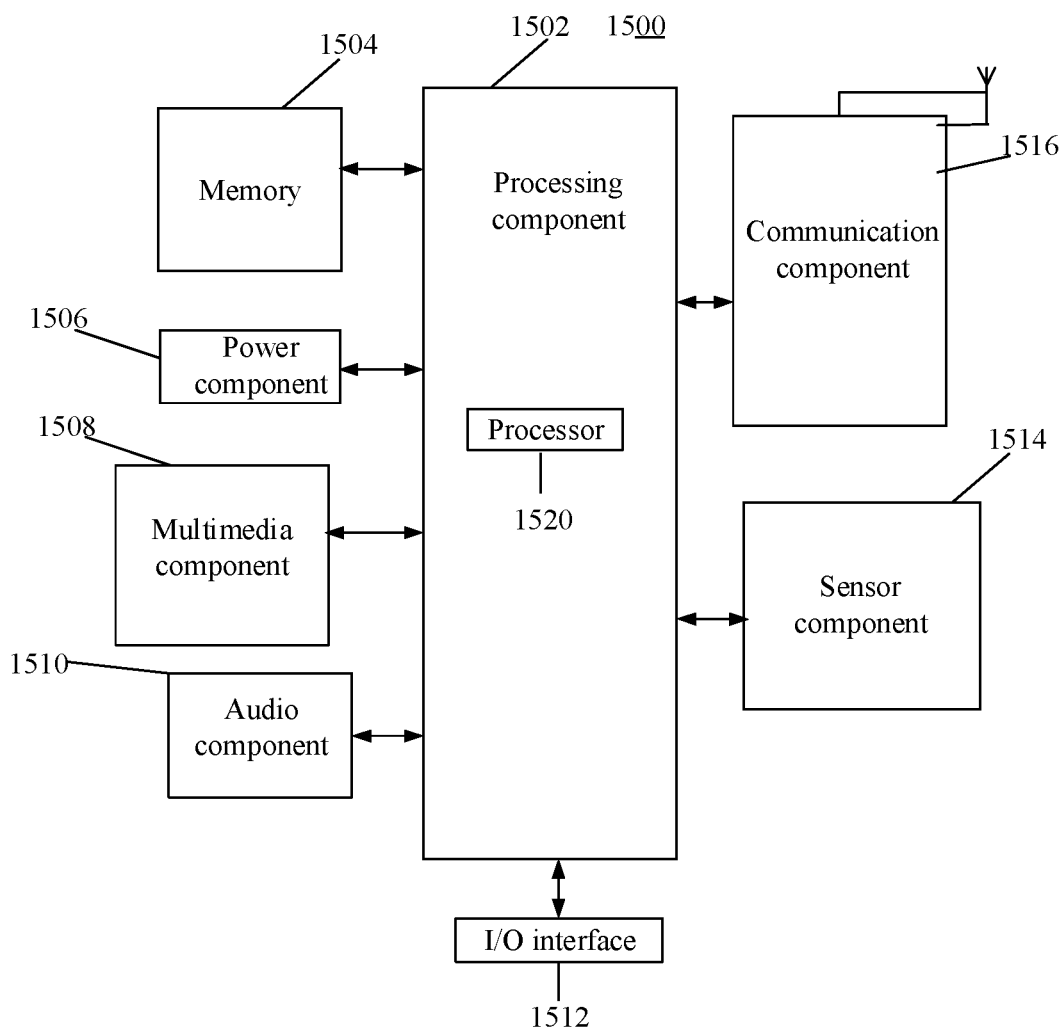
FIG. 6 is a block diagram of an image processing apparatus according to some embodiments.

FIG. 6 is a block diagram of an image processing apparatus 1500 according to some embodiments. For example, the device 1500 may be a mobile phone, a computer, a digital broadcast terminal, a messaging device, a gaming console, a tablet, a medical device, exercise equipment, a personal digital assistant and the like.

Referring to FIG. 6, the device 1500 may include one or more of the following components: a processing component 1502, a memory 1504, a power component 1506, a multimedia component 1508, an audio component 1510, an Input/Output (I/O) interface 1512, a sensor component 1514, and a communication component 1516.

The processing component 1502 is typically configured to control overall operations of the device 1500, such as the operations associated with display, telephone calls, data communications, camera operations, and recording operations. The processing component 1502 may include one or more processors 1520 to execute instructions to perform all or part of the operations in the abovementioned method. Moreover, the processing component 1502 may further include one or more modules which facilitate interaction between the processing component 1502 and the other components. For instance, the processing component 1502 may include a multimedia module to facilitate interaction between the multimedia component 1508 and the processing component 1502.

The memory 1504 is configured to store various types of data to support the operation of the device 1500. Examples of such data include instructions for any applications or methods operated on the device 1500, contact data, phonebook data, messages, pictures, video, etc. The memory 1504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1506 is configured to provide power for various components of the device 1500. The power component 1506 may include a power management system, one or more power supplies, and other components associated with generation, management and distribution of power for the device 1500.

The multimedia component 1508 may include a screen providing an output interface between the device 1500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1508 includes a front camera and/or a rear camera. The front camera and/or the rear camera may receive external multimedia data in a case that the device 1500 is in an operation mode, such as a photographing mode or a video mode. Each of the front camera and/or the rear camera may be a fixed optical lens system or have focusing and optical zooming capabilities.

The audio component 1510 is configured to output and/or input an audio signal. For example, the audio component 1510 includes a Microphone (MIC), and the MIC is configured to receive an external audio signal when the device 1500 is in the operation mode, such as a call mode, a recording mode and a voice recognition mode. The received audio signal may further be stored in the memory 1504 or sent through the communication component 1516. In some embodiments, the audio component 1510 further includes a speaker configured to output the audio signal.

The I/O interface 1512 may provide an interface between the processing component 1502 and a peripheral interface module, and the peripheral interface module may be a keyboard, a click wheel, a button and the like. The button may include, but not limited to: a home button, a volume button, a starting button and a locking button.

The sensor component 1514 may include one or more sensors configured to provide status assessment in various aspects for the device 1500. For instance, the sensor component 1514 may detect an on/off status of the device 1500 and relative positioning of components, such as a display and small keyboard of the device 1500, and the sensor component 1514 may further detect a change in a position of the device 1500 or a component of the device 1500, presence or absence of contact between the user and the device 1500, orientation or acceleration/deceleration of the device 1500 and a change in temperature of the device 1500. The sensor component 1514 may include a proximity sensor configured to detect presence of an object nearby without any physical contact. The sensor component 1514 may also include a light sensor, such as a Complementary Metal Oxide Semiconductor (CMOS) or Charge Coupled Device (CCD) image sensor, configured for use in an imaging application. In some embodiments, the sensor component 1514 may also include an acceleration sensor, a gyroscope sensor, a magnetic sensor, a pressure sensor or a temperature sensor.

The communication component 1516 is configured to facilitate wired or wireless communication between the device 1500 and another device. The device 1500 may access a communication-standard-based wireless network, such as a Wireless Fidelity (WiFi) network, a 2nd-Generation (2G) or 3rd-Generation (3G) network or a combination thereof. In some embodiments, the communication component 1516 receives a broadcast signal or broadcast associated information from an external broadcast management system through a broadcast channel. In some embodiments, the communication component 1516 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology or another technology.

In some embodiments, the device 1500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium including instructions, such as the memory 1504 including instructions, and the instructions may be executed by the processor 1520 of the device 1500 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Correspondingly, the present disclosure also provides a non-transitory computer-readable storage medium. The instructions in the storage medium, when executed by a processor of an image processing apparatus, enable the image processing apparatus to implement the image processing method including:

collecting at least one image within a field of view of an image collection device in real time through the image collection device of a terminal device;

determining whether a first image includes at least one character based on the collected first image;

under a situation that the collected first image includes the character, outputting prompt information to a user;

receiving a setting instruction input by the user; and improving sharpness of the character according to the setting instruction to obtain a second image, and compressing and storing the second image.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An image processing method, comprising:
   collecting, by an image collection device of a terminal device, at least one image within a field of view of the image collection device in real time, wherein the at least one image comprises a first image;

determining, by the terminal device, whether the first image comprises a region having at least one character larger than a preset area threshold;

in response to determining that the first image comprises the at least one character, outputting, by the terminal device, prompt information to a user;

receiving, by the terminal device, a setting instruction input by the user;

improving, by the terminal device, sharpness of the at least one character according to the setting instruction to obtain a second image, and compressing and storing the second image on the terminal device; and segmenting, by the terminal device, the first image to acquire the at least one character and a peripheral image region of the at least one character in the first image, wherein improving, by the terminal device, the sharpness of the at least one character comprises at least one of followings:

sharpening, by the terminal device, an edge of the at least one character; or increasing, by the terminal device, a contrast between the at least one character and the peripheral image region of the at least one character.

2. The method of claim 1, wherein segmenting, by the terminal device, the first image to acquire the at least one character and the peripheral image region of the at least one character in the first image comprises:

segmenting, by the terminal device, the first image to acquire different image regions; and performing, by the terminal device, optical character recognition on a plurality of sub-images within the different image regions to acquire the region having the at least one character and the peripheral image region of the at least one character in the first image.

3. The method of claim 2, wherein performing, by the terminal device, the optical character recognition on the plurality of sub-images within the different image regions to acquire the region having the at least one character and the peripheral image region of the at least one character in the first image comprises:

recognizing, by the terminal device, the plurality of sub-images within the different image regions based on the optical character recognition to obtain a plurality of character recognition results of the sub-images within the different image regions and a plurality of confidences of the character recognition results;

when a confidence of a sub-image within an image region is greater than a first threshold, determining that the image region is the region having the at least one character in the first image; and when the confidence of the sub image within the image region is less than or equal to the first threshold, determining that the image region is the peripheral image region of the at least one character.

4. The method of claim 3, further comprising:

when the confidence of the sub-image within the image region having the at least one character is greater than a second threshold, compressing the first image, wherein the second threshold is greater than the first threshold.

5. The method of claim 4, wherein improving, by the terminal device, the sharpness of the at least one character to obtain the second image comprises:

improving, by the terminal device, the sharpness of the at least one character to obtain the second image when the confidence of the sub-image within the image region having the at least one character is less than or equal to the second threshold.

6. The method of claim 1, further comprising:

determining, by the terminal device, whether an image compression function is enabled according to image compression information in the setting instruction, wherein improving, by the terminal device, the sharpness of the at least one character to obtain the second image, and compressing and storing, by the terminal device, the second image comprises: improving, by the terminal device, the sharpness of the at least one character to obtain the second image, and compressing and storing, by the terminal device, the second image when the image compression function is enabled and the first image comprises the at least one character.

7. The method of claim 1, wherein compressing and storing, by the terminal device, the second image comprises at least one of followings:

converting the second image from a color image into a black-and-white image for storage; and converting the second image from a color image into a gray image for storage.

8. An image processing apparatus, comprising:

a processor; and a memory configured to store instructions executable by the processor, wherein the processor is configured to perform acts comprising:

collecting, by an image collection device of the image processing apparatus, at least one image within a field of view of the image collection device in real time, wherein the at least one image comprises a first image;

determining whether the first image comprises a region having at least one character larger than a preset area threshold;

in response to determining that the first image comprises the at least one character, outputting prompt information to a user;

receiving a setting instruction input by the user;

improving sharpness of the at least one character according to the setting instruction to obtain a second image, and compress and store the second image; and segmenting, by the terminal device, the first image to acquire the at least one character and a peripheral image region of the at least one character in the first image, wherein improving, by the terminal device, the sharpness of the at least one character comprises at least one of followings:

sharpening, by the terminal device, an edge of the at least one character; or increasing, by the terminal device, a contrast between the at least one character and the peripheral image region of the at least one character.

9. The apparatus of claim 8, wherein segmenting the first image to acquire the at least one character and the peripheral image region of the at least one character in the first image comprises:

segmenting the first image to acquire different image regions, and performing optical character recognition on a plurality of sub-images within the different image regions to acquire the region having the at least one character and the peripheral image region of the at least one character in the first image.

10. The apparatus of claim 9, wherein performing the optical character recognition on the plurality of sub-images within the different image regions to acquire the region having the at least one character and the peripheral image region of the at least one character in the first image comprises:
recognizing the plurality of sub-images within the different image regions based on the optical character recognition to obtain a plurality of character recognition results of the sub-images within the different image regions and a plurality of confidences of the character recognition results;
when a confidence of a sub-image within an image region is greater than a first threshold, determining that the image region is the region having the at least one character in the first image;
when the confidence of the sub-image within the image region is less than or equal to the first threshold, determining that the image region is the peripheral image region of the at least one character.

11. The apparatus of claim 10, wherein the processor is further configured to perform acts comprising:
when the confidence of the sub-image within the image region having the at least one character is greater than a second threshold, compressing the first image, wherein the second threshold is greater than the first threshold.

12. The apparatus of claim 11, wherein improving the sharpness of the at least one character to obtain the second image comprises:
improving the sharpness of the at least one character to obtain the second image when the confidence of the sub-image within the image region having the at least one character is less than or equal to the second threshold.

13. The apparatus of claim 8, wherein the processor is further configured to perform acts comprising:
determining whether an image compression function is enabled according to image compression information in the setting instruction, and
wherein improving the sharpness of the at least one character to obtain the second image, and compressing and storing the second image comprises: improving the sharpness of the at least one character to obtain the second image, and compressing and storing the second image when the image compression function is enabled and the first image comprises the at least one character.

14. The apparatus of claim 8, wherein compressing and storing the second image comprises at least one of followings:
converting the second image from a color image into a black-and-white image for storage; and
converting the second image from a color image into a gray image for storage.

15. A non-transitory computer-readable storage medium storing a plurality of programs for execution by an image processing apparatus having one or more processors, wherein the plurality of programs, when executed by the one or more processors, cause the image processing apparatus to perform acts comprising:
collecting, by an image collection device of the image processing apparatus, at least one image within a field of view of the image collection device in real time, wherein the at least one image comprises a first image;
determining whether the first image comprises a region having at least one character larger than a preset area threshold;
in response to determining that the first image comprises the at least one character, outputting prompt information to a user;
receiving a setting instruction input by the user;
improving sharpness of the at least one character according to the setting instruction to obtain a second image, and compressing and storing the second image; and
segmenting, by the terminal device, the first image to acquire the at least one character and a peripheral image region of the at least one character in the first image,
wherein improving, by the terminal device, the sharpness of the at least one character comprises at least one of followings:
sharpening, by the terminal device, an edge of the at least one character; or
increasing, by the terminal device, a contrast between the at least one character and the peripheral image region of the at least one character.

16. The non-transitory computer-readable storage medium of claim 15, wherein segmenting the first image to acquire the at least one character and the peripheral image region of the at least one character in the first image comprises:
segmenting the first image to acquire different image regions; and
performing optical character recognition on a plurality of sub-images within the different image regions to acquire the region having the at least one character and the peripheral image region of the at least one character in the first image.

17. The non-transitory computer-readable storage medium of claim 16, wherein performing the optical character recognition on the plurality of sub-images within the different image regions to acquire the region having the at least one character and the peripheral image region of the at least one character in the first image comprises:
recognizing the plurality of sub-images within the different image regions based on the optical character recognition to obtain a plurality of character recognition results of the sub-images within the different image regions and a plurality of confidences of the character recognition results;
when a confidence of a sub-image within an image region is greater than a first threshold, determining that the image region is the region having the at least one character in the first image; and
when the confidence of the sub-image within the image region is less than or equal to the first threshold, determining that the image region is the peripheral image region of the at least one character.

* * * * *